(No Model.)
W. H. COX & C. HUGHES.
LEMON SQUEEZER.
No. 594,728.  Patented Nov. 30, 1897.
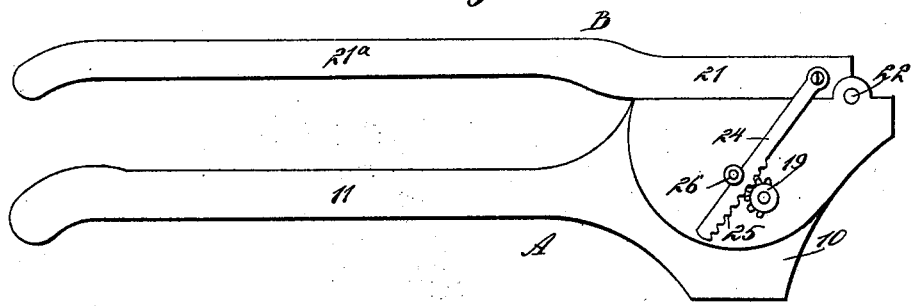
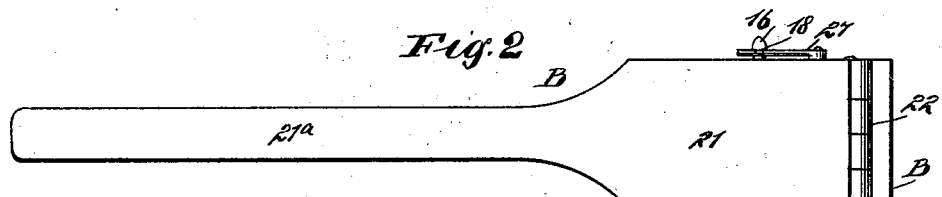
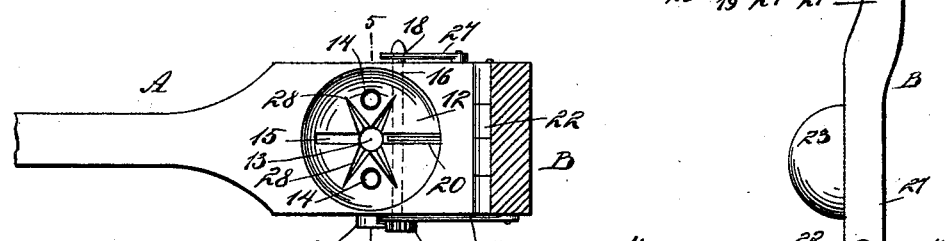
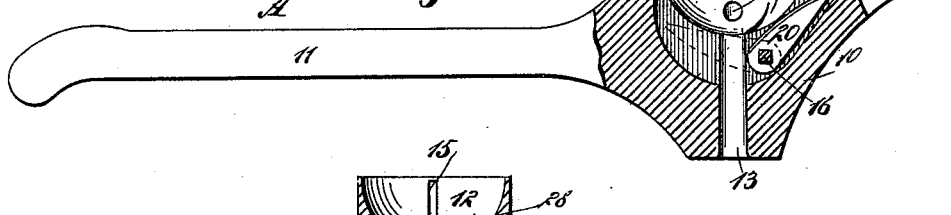
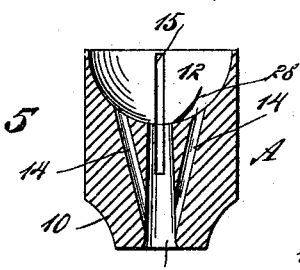
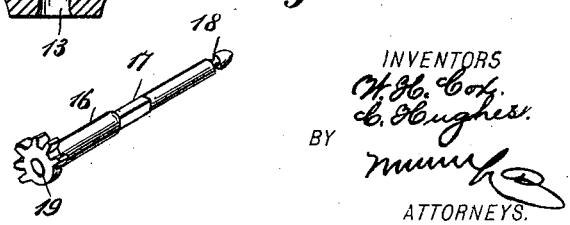
WITNESSES:
INVENTORS
W. H. Cox.
C. Hughes.
BY
ATTORNEYS.

UNITED STATES PATENT OFFICE.

WILLIAM H. COX AND CHARLES HUGHES, OF RED BLUFF, CALIFORNIA.

LEMON-SQUEEZER.

SPECIFICATION forming part of Letters Patent No. 594,728, dated November 30, 1897.

Application filed July 15, 1897. Serial No. 644,617. (No model.)

*To all whom it may concern:*

Be it known that we, WILLIAM H. COX and CHARLES HUGHES, of Red Bluff, in the county of Tehama and State of California, have invented a new and useful Improvement in Lime and Lemon Squeezers, of which the following is a full, clear, and exact description.

Our invention relates to machines or devices for extracting the juice from limes and lemons.

The object of the invention is to provide a juice extractor or squeezer which will be simple, compact, portable, and inexpensive, and so constructed that the operator by a single movement may cut a lime or a lemon and extract the juice.

A further object of the invention is to provide for cutting a lime or lemon from its bottom within a predetermined distance of its top, whereby the upper portion of the rind will not be severed, preventing any upward escape of juices during the operation of compressing and compelling all of the juices to pass out from the device through the exit made for that purpose.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a squeezer, illustrating one member as closed upon the other. Fig. 2 is a plan view of the squeezer. Fig. 3 is a partial side elevation and partial vertical section of the squeezer, one of the members being carried away from the other, the parts being in position to admit of the introduction or the extraction of a lemon or a lime. Fig. 4 is a horizontal section on the line 4 4 of Fig. 3. Fig. 5 is a vertical section on the line 5 5 of Fig. 4, and Fig. 6 is a detail perspective view of the shaft adapted to carry the knife of the squeezer.

The squeezer may be said to consist primarily of two members A and B. The member A, which is the lower member, comprises a body 10 and a handle 11. In the upper face of the body 10 a concavity or a pocket 12 is formed of such dimensions and shape as to readily receive an entire lemon or a lime. A channel 13 is produced in the body, extending from its bottom into the pocket 12, and the expressed juices will find their way outward through this channel. In order to afford a quick delivery of the juices from the pocket 12, auxiliary exit-channels 14 are employed, connecting with the pocket at its sides and connecting with the main exit-channel 13 preferably near its lower end, as shown in Fig. 5. A longitudinal slot 15 is made centrally in the pocket and extends within the body below the pocket, the bottom portion of the slot being more or less concaved, as shown in Fig. 3. At the rear of the main exit-channel 13 and within the lower portion of the longitudinal slot 15 a shaft 16 is journaled in the said body, extending through from side to side. This shaft, as illustrated in Fig. 6, is usually provided with a central polygonal surface 17, while at one end an annular recess 18 is formed and at the opposite end a gear 19, preferably of the mutilated type, is firmly fastened.

A knife 20 is located on the polygonal section 17 of the shaft 16, the forward edge of the knife being the cutting edge, and as the shaft is rocked the knife will pass from one end of the slot 15 to the other, assuming alternately the two positions shown, respectively, in full and dotted lines in Fig. 3, and the knife in its passage from one end of the slot 15 to the other is carried through the pocket 12. The knife 20 is of such length that when it is in its perpendicular position it will not extend above the top of the pocket, so that when a lemon or a lime is placed in the pocket the knife will sever the lower portion thereof and will not cut through the upper rind.

The upper member B of the device comprises a body 21 and a handle 21ª, the body 21 having a hinged or pivotal connection 22 with the rear upper portion of the body 10 of the lower member. A bulb 23 or a semispherical projection is formed upon the under face of the body of the upper member B, occupying such a position that when the body portions of the two members are brought in engagement the bulb or projection 23 will enter the pocket 12 and by engagement with the lemon or lime in said pocket express the juice therefrom in the usual manner. It is evident that since the bottom and lower end portions of the lime or lemon are the only parts cut by the knife when the bulb 23 engages with the uppermost portion of the outer surface of the rind the juice cannot escape upward, but must find an exit through the channel 13, the cut in the bottom of the lemon or lime permitting a ready escape of the juice.

The knife is operated by the act of opening and closing the upper member 13, and the movement of the knife is preferably accomplished by pivoting to one side of the body of the upper member B one end of a rack-bar 24, having teeth 25 upon its rear or under edge, arranged for engagement with the teeth of the mutilated gear 19, while the upper or forward edge of the rack-bar will travel in engagement with a guide 26, which may be capable of rotary movement. By this construction it is obvious that the shaft will be rocked each time that the upper member is carried to or from the lower member. When the upper member is in the vertical position or at a right-angle to the lower member, the knife will be at the rear of the pocket, as illustrated in positive lines in Fig. 3, but when the upper member is carried downward upon the lower member of the device the knife will have traveled across the pocket and will occupy the position shown in dotted lines in Fig. 3, below the bottom and forward portion of the pocket 12 and in the slot 15.

The shaft may be removed when it is desired to sharpen the knife, and ordinarily said shaft is held in position in the body of the lower member A through the medium of a spring 27, attached to the side of the body portion of this member and entering at its free end the groove 18 in the end portion of the said shaft, as illustrated in Fig. 4.

In order to accelerate the passage of the expressed juice from the pocket 12, the bottom of said pocket is provided with grooves 28, which lead to the upper portion of the exit-channel 13, the grooves 28 being enlarged where they communicate with the said channel, as shown in Fig. 4.

Having thus described our invention, we claim as new and desire to secure by Letters Patent—

1. In a lime or lemon squeezer, pivotally-connected members, one of which is provided with a pocket to receive a lemon or a lime, the other member being provided with a projection arranged to enter the pocket, a knife mounted in the member with the pocket and adapted to traverse the said pocket, and means for operating the knife by a swinging movement of one of said members.

2. In a lime or lemon squeezer, a receiving and a compressing member, the receiving member being provided with a pocket and the compressing member with a projection arranged to enter the said pocket, and a knife pivoted in the receiving-pocket and arranged to cross the pocket, the said knife being of such length as to enter a lemon or a lime placed in the pocket, and sever the same at its bottom and end portion, leaving the upper outer portion intact, and means, substantially as described, for operating the knife by the opening and closing of the compressing member, as specified.

3. In a lime or lemon squeezer, a receiving member having a pocket arranged to receive a lemon or a lime, and an exit-channel leading from the said pocket, a shaft pivoted in the receiving member at one side of the exit-channel, a knife carried by the said shaft, a compressing member pivoted to the receiving member, and means for rocking the shaft by the opening and closing of the said compressing member.

4. In a lime or lemon squeezer, the combination, with a receiving member and a knife pivoted in the receiving member and arranged to pass through a pocket in the receiving member and from side to side of said pocket, of a compressing member, and a rack-and-pinion connection between the knife-support of the receiving member and the compressing member of the squeezer, for the purpose set forth.

5. In a lime or lemon squeezer, the combination, with a receiving member having a pocket for the reception of a lemon or a lime, an exit-opening leading from the said pocket, and a compressing member pivoted to the receiving member, of a shaft extending through the receiving member, a knife carried by the said shaft and arranged to traverse the said pocket, a pinion carried by the shaft, and a sliding rack engaging with the pinion and connected with the compressing member of the squeezer.

6. In a lime or lemon squeezer, the combination, with a receiving member having a pocket for the reception of a lemon or a lime, an exit-opening leading from the said pocket, and a compressing member pivoted to the receiving member, of a shaft extending through the receiving member, a knife carried by the said shaft and arranged to traverse the said pocket, a pinion carried by the shaft, and a sliding rack engaging with the pinion and connected with the compression member of the squeezer, the said shaft being removable and provided with a groove at one of its ends, and a spring-keeper attached to the receiving member of the squeezer and arranged to enter the groove in the said shaft, for the purpose set forth.

WILLIAM H. COX.
CHARLES HUGHES.

Witnesses:
A. B. FULLER,
A. M. McCOY.